US011554579B2

(12) United States Patent
Lath (10) Patent No.: US 11,554,579 B2
(45) Date of Patent: Jan. 17, 2023

(54) STRUCTURE THAT FORMS A VISUAL REPRESENTATION AND METHOD FOR MAKING THE SAME (71) Applicant: SENSITILE SYSTEMS, LLC, Ypsilanti, MI (US)

(72) Inventor: Abhinand Lath, Ann Arbor, MI (US)

(73) Assignee: SENSITILE SYSTEMS, LLC, Ypsilanti, MI (US)

( * ) Notice: Subject to any disclaimer, the term of this patent is extended or adjusted under 35 U.S.C. 154(b) by 156 days.

(21) Appl. No.: 16/934,298

(22) Filed: Jul. 21, 2020

(65) Prior Publication Data
US 2022/0024197 A1 Jan. 27, 2022

(51) Int. Cl.
| B32B 17/06 | (2006.01) |
| B41C 1/05 | (2006.01) |
| G06V 10/75 | (2022.01) |
| B32B 17/00 | (2006.01) |
| B44C 1/22 | (2006.01) |
| B32B 3/26 | (2006.01) |
| B32B 37/12 | (2006.01) |
| B32B 38/10 | (2006.01) |

(52) U.S. Cl.
CPC ............... *B41C 1/05* (2013.01); *B32B 3/263* (2013.01); *B32B 17/00* (2013.01); *B32B 17/06* (2013.01); *B32B 37/12* (2013.01); *B44C 1/225* (2013.01); *G06V 10/751* (2022.01); *B32B 38/10* (2013.01); *B32B 2307/418* (2013.01); *B41C 2201/04* (2013.01); *B41C 2201/12* (2013.01); *B41C 2210/14* (2013.01)

(58) Field of Classification Search
CPC ... B32B 17/00; B32B 17/06; B32B 2307/418; B32B 37/12; B32B 38/10; B32B 3/263; B41C 1/05; B41C 2201/04; B41C 2201/12; B41C 2210/14; B41M 5/24; B44C 1/225; B44C 1/228; B44F 1/066; G06V 10/751
See application file for complete search history.

(56) References Cited

U.S. PATENT DOCUMENTS

2016/0263722 A1* 9/2016 Nelson ................ B24D 11/001

* cited by examiner

Primary Examiner — Lawrence D Ferguson
(74) Attorney, Agent, or Firm — Darrow Mustafa PC (57) ABSTRACT A structure that forms a visual representation may include a first outer layer, a second outer layer, and an interlayer being disposed between the first outer layer and the second outer layer. The interlayer may have a first side adjacent to the first outer layer and a second side adjacent to the second outer layer. The interlayer includes a plurality of cuts extending from the first side of the interlayer towards the second side of the interlayer. Each of the plurality of cuts may have an angle with respect to a plane formed by a surface of the first side of the interlayer. Each angle for at least a portion of the plurality of cuts is based on one or more pixel values of at least one image that forms the basis of the visual representation.

13 Claims, 6 Drawing Sheets

STRUCTURE THAT FORMS A VISUAL REPRESENTATION AND METHOD FOR MAKING THE SAME

TECHNICAL FIELD

The subject matter described herein relates, in general, to a structure that forms a visual representation and method for making the same.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Structures that form visual representations, such as decorative panels, can vary significantly in cost and complexity. Some structures are simple rigid structures that have one or more images that have been etched into the structure using an engraving process, such as a laser engraving process. The engraving process is the practice of incising a design on to a hard, usually flat surface by cutting grooves into it.

More complex visual representations may utilize several different elements to form a mosaic. These types of visual representations may utilize smaller components that are built up from small regular or irregular pieces of different substances, such as stone, glass, and/or ceramic. In particular, the use of glass and glasslike substances, such as mirrors, allows for more complex visual representations that reflect and/or absorb light provided to the visual representation providing a unique and satisfying visualization. However, these types of visual representations are highly complex and are generally expensive to manufacture. Each visual representation may be unique in and of itself, making it difficult to mass-produce such types of complex visual representations.

SUMMARY

This section generally summarizes the disclosure and is not a comprehensive explanation of its full scope or all its features.

In one example, a structure that forms a visual representation may include a first outer layer, a second outer layer, and an interlayer being disposed between the first outer layer and the second outer layer. The interlayer may have a first side adjacent to the first outer layer and a second side adjacent to the second outer layer. The interlayer includes a plurality of cuts extending from the first side of the interlayer towards the second side of the interlayer. Each of the plurality of cuts has an angle with respect to a plane formed by a surface of the first side of the interlayer. Each angle for at least a portion of the plurality of cuts is based on a pixel value of at least one image that forms the basis of the visual representation.

In another example, a method for producing a structure that forms a visual representation may include the steps of obtaining at least one image having a plurality of pixels having a location and a pixel value that represents an intensity of the pixel, generating angle values based on the pixel values for at least a portion of the plurality of pixels, and cutting into an interlayer a plurality of cuts extending from a first side of the interlayer towards a second side of the interlayer. Each angle for at least a portion of the plurality of cuts is based on one or more pixel values of at least one image that forms the basis of the visual representation. Thereafter, a first outer layer and a second outer layer may be adhered to a first side and second side of the interlayer, respectively.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A structure that forms a visual representation may include an interlayer that is located between two outer layers. The interlayer has a plurality of cuts that extend from a first side of the interlayer towards a second side of the interlayer. Each of the cuts has an angle with respect to a plane formed by a surface of the first side of the interlayer. The angle of each cut may vary depending on one or more pixel values from the electronic image that forms the basis of the visual representation. For example, the electronic image may be a picture of a maple leaf. The cuts placed within the interlayer at different angles allow the interlayer to form of visual representation that mimics the electronic image of the maple leaf.

Figure 1:
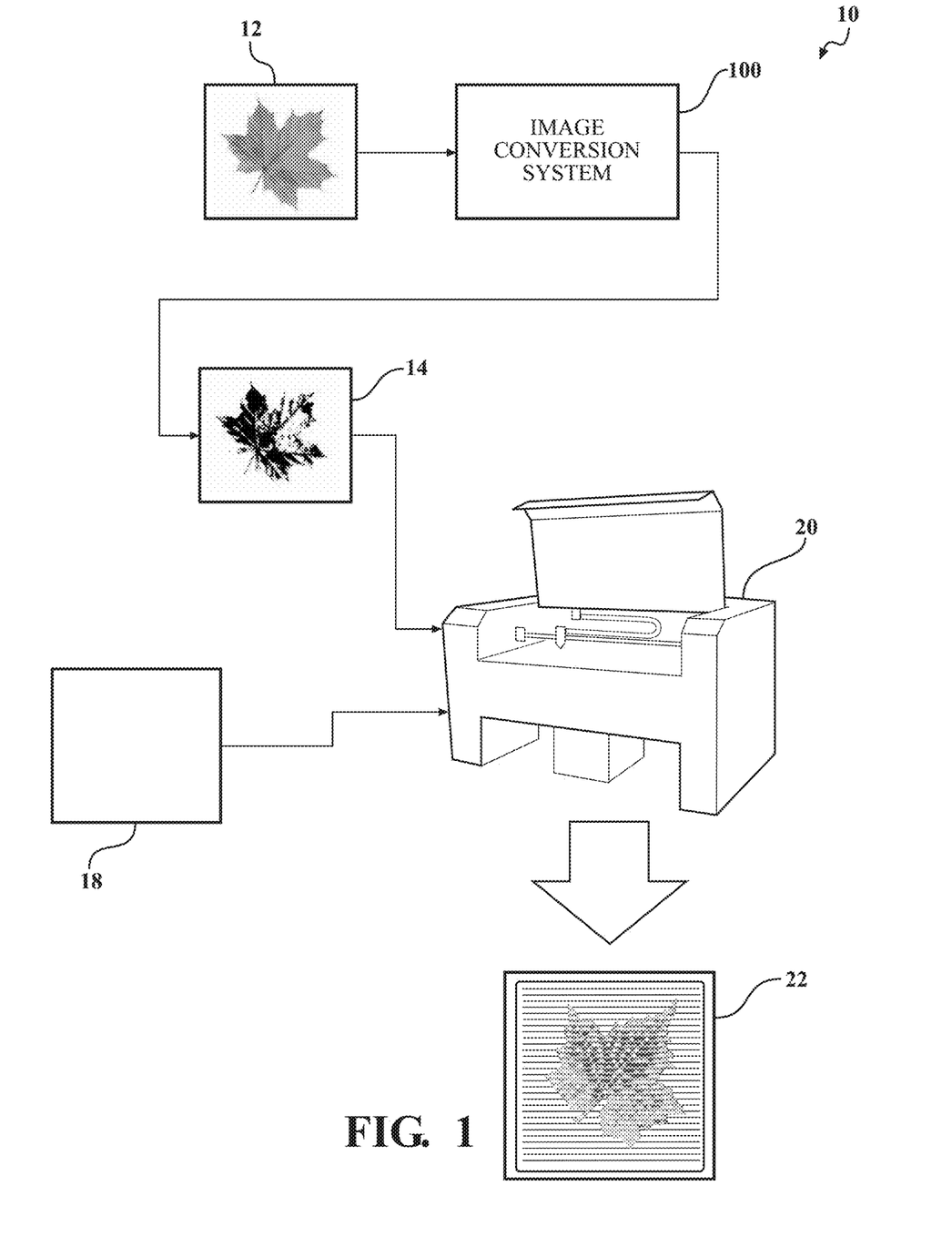
FIG. 1 illustrates a process flow for making a structure that forms a visual representation.

Referring to FIG. 1, illustrated is a process flow 10 for generating an interlayer 22 that forms part of a structure that forms a visual representation. It should be understood that the process flow 10 is to provide a brief summary of the process utilized to generate the interlayer 22. The specific intricacies of the interlayer 22, as well as other components that form the structure, will be described in greater detail later in this specification.

With regards to the process flow 10, the process flow 10 begins with an image 12. The image 12 can be any kind of electronic image using any one of several different file formats. As such, the image 12 could utilize file formats such as JPEG, PNG, TIFF, GIF, bitmap, Adobe Acrobat portable document format, and the like. It should be understood that the file format of the electronic image can vary from application to application and can vary based on any known current or future file format technique.

As to the image 12 itself, the image 12 can be, in one example, a two-dimensional image formed from a plurality of pixels. Each pixel may include information regarding the location of the pixel, as well as a pixel value, which may be an intensity value. The intensity value of a pixel may be a single value for a gray-scale image or three values for a color image. The image 12 may be a picture, such as a maple leaf as shown. However, the image 12 may take any one of several different forms. For example, the image may be a graphic(s), letter(s), number(s), landscape image(s), geometric shape(s), abstract pattern(s), face(s) of a human or animal, natural scene(s), or combinations thereof.

An image conversion system 100, which will be described in greater detail later in the specification, receives the image 12 and essentially converts the image 12 to a mapping array 14. The mapping array 14 is essentially an array that includes the location for each cut made into an interlayer in the angle of each cut made into the interlayer. Moreover, a cutting device 20 receives the mapping array 14 and then cuts into an interlayer 18 to generate a finished interlayer 22, which forms a visual representation based on the image 12. The cutting device 20 may be a three-dimensional laser cutting device that is configured to cut and/or engrave into different materials. For example, the interlayer 18 or 22 may be polymethyl methacrylate, thermoplastic polyurethane, ethylene-vinyl acetate, polyethylene terephthalate glycol, polycarbonate, and/or glass. Further, the interlayer 18 or 22 may include ultraviolet absorbing materials and/or fluorescent materials.

The cutting device 20 may utilize one or more different types of lasers, such as a $CO_2$ laser. The laser cutting device 20 has a laser head that has multiple degrees of movement, essentially allowing the laser head to perform three-dimensional laser cuts. As will be explained in greater detail later in this specification, the cutting device 20 can form one or more cuts into the surface of the interlayer 18 to form the finished interlayer 22. Each of the cuts formed into the interlayer 18 may be angled in such a way to create a visual representation that mimics the image 12, as best shown as the finished interlayer 22, which mimics the image 12.

Figure 2:
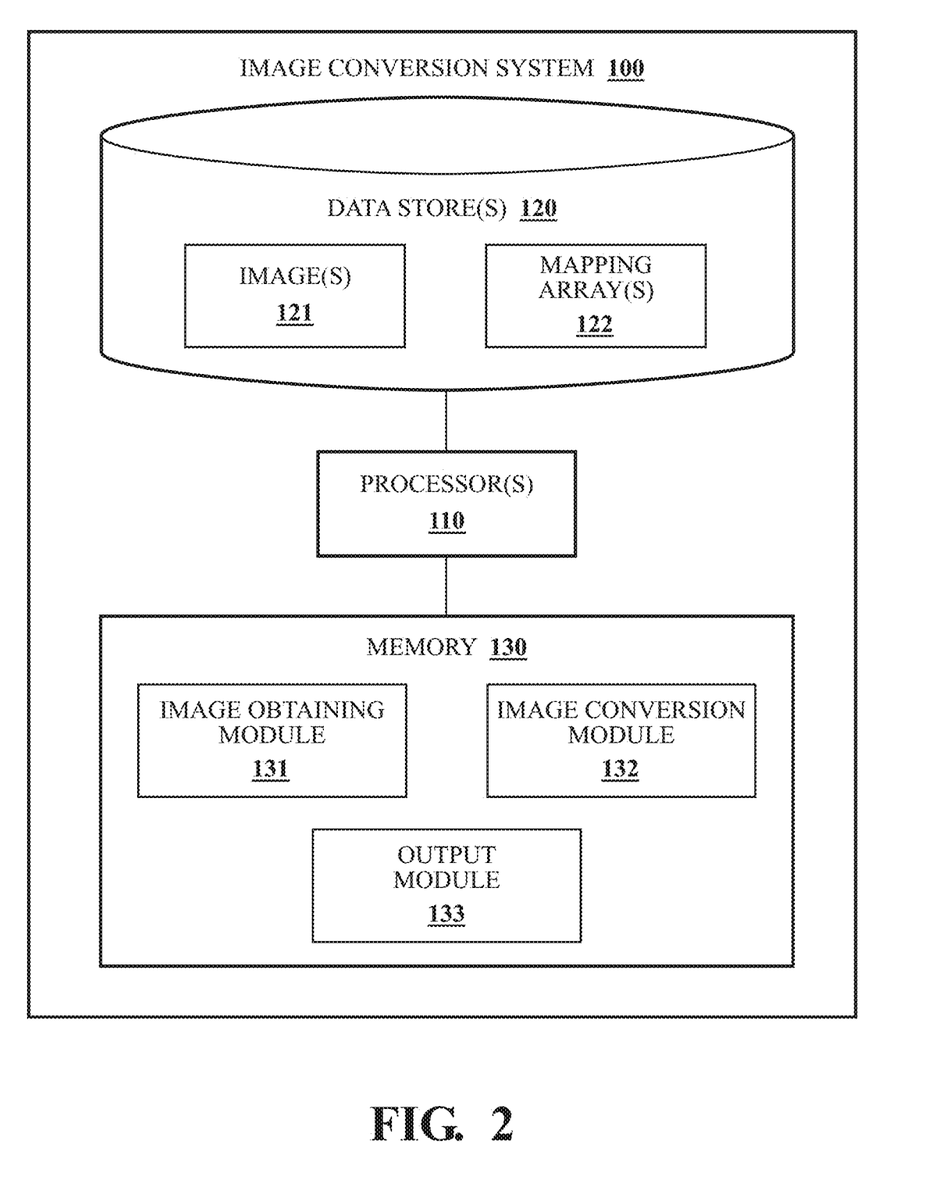
FIG. 2 illustrates an image conversion system for use with making the structure that forms the visual representation.

With reference to FIG. 2, one embodiment of the image conversion system 100 is further illustrated. As shown, the image conversion system 100 includes a processor(s) 110. Accordingly, the processor(s) 110 may be a part of the image conversion system 100 or the image conversion system 100 may access the processor(s) 110 through a data bus or another communication path. In one or more embodiments, the processor(s) 110 is an application-specific integrated circuit that is configured to implement functions associated with an image obtaining module 131, an image conversion module 132, and an output module 133. In general, the processor(s) 110 is an electronic processor such as a microprocessor that is capable of performing various functions as described herein.

In one embodiment, the image conversion system 100 includes a memory 130 that stores the image obtaining module 131, the image conversion module 132, and the output module 133. The memory 130 may be a random-access memory (RAM), read-only memory (ROM), a hard disk drive, a flash memory, or other suitable memory for storing the modules 131-133. The modules 131-133 are, for example, computer-readable instructions that, when executed by the processor(s) 110, cause the processor(s) 110 to perform the various functions disclosed herein.

Furthermore, in one embodiment, the image conversion system 100 includes a data store(s) 120. The data store(s) 120 is, in one embodiment, an electronic data structure such as a database that is stored in the memory 130 or another memory and that is configured with routines that can be executed by the processor(s) 110 for analyzing stored data, providing stored data, organizing stored data, and so on. Thus, in one embodiment, the data store(s) 120 stores data used and/or generated by the modules 131-133 in executing various functions. In one embodiment, the data store(s) 120 includes one or more images 121 and one or more mapping arrays 122. The images 121 may be images similar to the image 12 of FIG. 1, while the mapping arrays 122 may be similar to the mapping array 14 of FIG. 1.

As to the modules 131-133, the image obtaining module 131 causes the processor(s) 110 to obtain an image that will form the basis of the visual representation formed within the structure. In one example, referring back to FIG. 1, the image 12 may be a picture. However, the image 12 may take any one of several different forms, as previously mentioned.

Regardless of the type of image, the image conversion module 132 causes the processor(s) 110 to convert the image 12 into a mapping array 14. As stated previously, the image 12, and images like it, may be made up of a plurality of pixels. Each pixel may have a location value and a pixel value, which may be an intensity value. If the image is a black-and-white or gray-scale image, the intensity value may be a single value indicating how light or dark the pixel is. If the image is a color image, the intensity value of each pixel of the color image may include three values that have different intensities.

In one example, the image conversion module 132 causes the processor(s) 110 to receive the intensity values from the image. In one example, if the image is a color image, the image conversion module 132 may first convert the color image to a gray-scale image, thus creating only one set of intensity values for each pixel of the color image.

Figure 3:
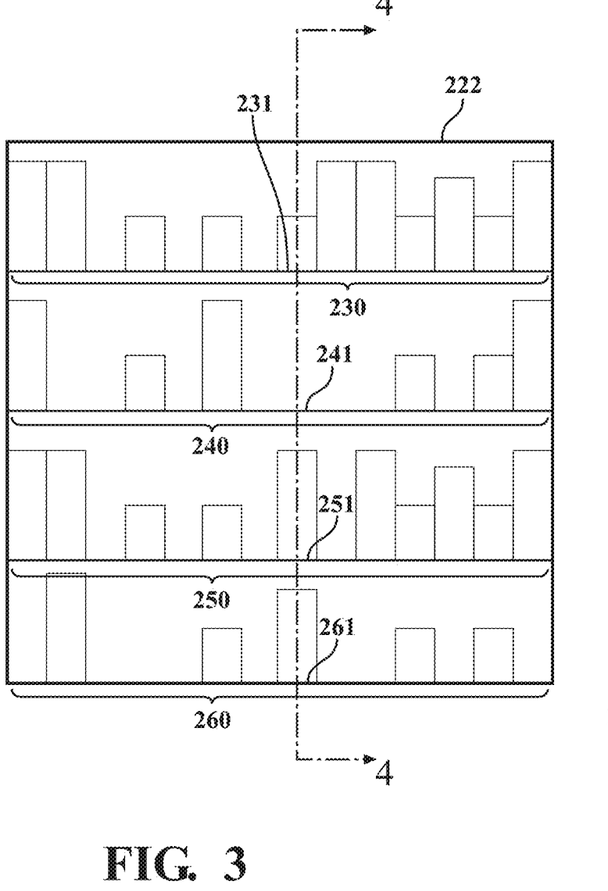
FIG. 3 illustrates a more detailed view of an interlayer of a structure that forms a visual representation.

The image conversion module 132 then determines the location and angle for each cut that will be formed into the interlayer, such as the interlayer 18. The angle of each cut is based on the intensity values of one or more pixels from the image. For example, FIG. 3 illustrates a front view of a finished interlayer 222 that has a plurality of cuts 230, 240, 250, and 260. In this example, each of the cuts 230, 240, 250, and 260 has a substantially equal with, but the angles of the cuts 230, 240, 250, and 260 varies.

Figure 4:
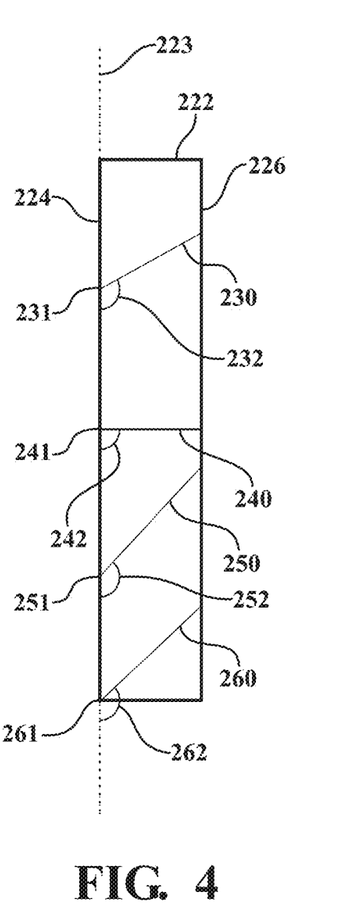
FIG. 4 illustrates a sectional view of the interlayer generally taken along lines 4-4 of FIG. 3.

In order to illustrate this difference more clearly, reference is made to FIG. 4, which is a sectional view taken along lines 4-4 of FIG. 3. Here, the finished interlayer 222 has a first side 224 and a second side 226 that may be substantially flat. Also shown are the cuts 230, 240, 250, and 260. The cut 230 has an incision 231 at an angle 232. The cut 240 has an incision 241 at an angle 242. The cut 250 has an incision 251 at an angle 252. The cut 260 has incision 261 at an angle 262. In this example, the angles 232, 242, 252, and 262 are measured from plane 223 defined by the first side 224 of the interlayer 222. The incisions 231, 241, 251, and 261 may be the substantially same direction, as best shown in FIG. 3, which each show the incisions 231, 241, 251, and 261 being in a horizontal direction.

Also, brief mention should be made regarding the cuts 230, 240, 250, and 260. The cuts 230, 240, 250, and/or 260 may extend from the incisions 231, 241, 251, and 261, respectively, of the first side 224 of the interlayer 222 towards the second side 226. The cuts 230, 240, 250, and/or 250 may extend completely from the incisions 231, 241, 251, and 261, respectively, to the second side 226 or, alternatively, may only extend into the interlayer 222 but not reach the second side 226 of the interlayer 222.

With regards to the angles 232, 242, 252, and 262 and how they relate to the pixel values of an image, the angles 232, 242, 252, and 262 generally create an optical representation depending on the angle. For example, the angle 242 is approximately 90° with respect to the first side 224 of the interlayer 222. As such, the cut 240 extends directly into the interlayer 222 from the incision 241. The cut 240 may relate to one or more pixels that have a low-intensity value, such as one or more pixels that are generally lighter in color or shade. Conversely, the cut 250 has a much larger angle 252. In this example, the cut 250 would be more representative of one or more pixels that have a higher intensity value, such as a darker color or shade. The cuts 230 and 260 have angles 232 and 262, respectively, that may represent a more middle intensity. As such, the cuts 230 and 260 may represent one or more pixels that have less intensity than the pixels that formed the cut 250, but more intensity than the pixels that form the cut 240.

As such, each cut 230, 240, 250, and/or 260 formed within the interlayer 222 may represent one or more pixels. The angles of each cut 230, 240, 250, and/or 260 varies based on the one or more intensity values of the one or more pixels that the cuts represent. If the cut represents more than one pixel, the angle the cut may be based on averaging the intensity values of the pixels or some other mathematical normalization.

As such, once the interlayer 222 has been cut by the cutting device 20 using a mapping array 14 that contains the location of the cuts 230, 240, 250, and 260 and their respective angles 232, 242, 252, and 262, the interlayer 222 may form a pleasing visual representation, as best shown by the finished interlayer 22 in FIG. 1.

As to the output module 133, the output module 133 causes the processor(s) 110 to output the mapping arrays 122 to the cutting device 20, wherein the cutting device 20 will make the appropriate cuts, at the appropriate locations, and at the appropriate angles in the interlayer 18 to generate the finished interlayer 22. It should be understood that while the image conversion system 100 is shown separately from the cutting device 20 of FIG. 1, it is possible that the image conversion system 100 may be incorporated within the cutting device 20 or may be located separately, as shown in FIG. 1.

Once the interlayer 22 has been produced as described above, the interlayer 22 may be sandwiched between one or more other layers. For example, referring to FIG. 5, this figure illustrates a structure 301 having an interlayer 322. The interlayer 322 may be similar to the interlayer 22, as previously described. The interlayer 322 has a first side 324 and a second side 326. In this example, the cuts formed within the interlayer 322 are not shown, but it should be understood that the interlayer 322 may have one or more cuts that provide a visual representation of an image.

Figure 5:
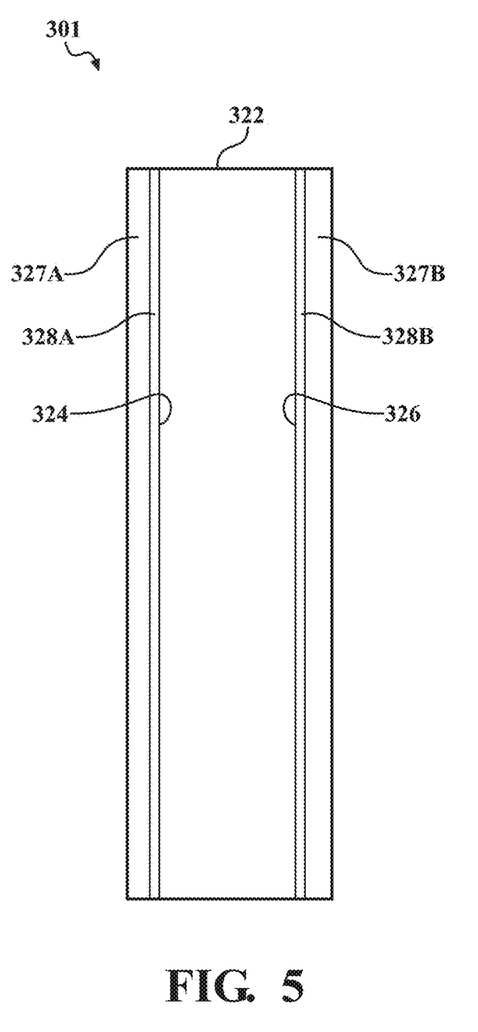
FIGS. 5 and 6 illustrate different examples of the structure that forms a visual representation.

Here, the interlayer 322 is located between a first outer layer 327A and a second outer layer 327B that may be moth substantially flat. The first outer layer 327A and the second outer layer 327B may be made of polymethyl methacrylate, polyethylene terephthalate glycol, polycarbonate, and/or glass. The first outer layer 327A and/or the second outer layer 327B may be transparent or may be partially transparent. Furthermore, the first outer layer 327A and/or the second outer layer 327B may be partially transparent and/or be dyed with one or more colors to create a unique optical effect.

The first outer layer 327A may be adhered to the first side 324 of the interlayer 322 using an adhesive 328A, while the second side 326 of the interlayer 322 may be adhered to the second outer layer 327B using an adhesive 328B. The adhesive 328A and/or adhesive 328B may be an optically transparent adhesive.

Figure 6:
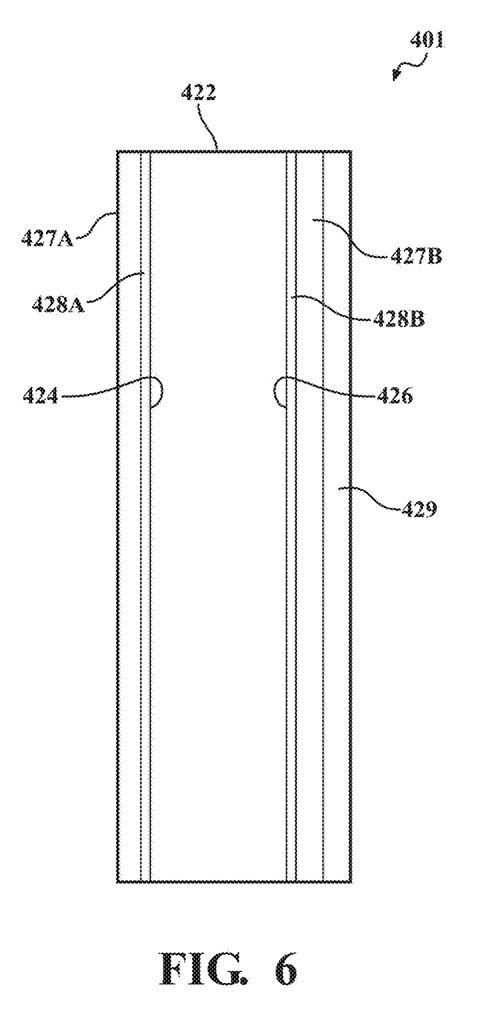

Referring to FIG. 6, another example of the structure 401 is shown. In this example, the structure 401 is similar to the structure 301 of FIG. 5. Similar reference numerals have been utilized to refer to similar components, and, as such, the prior description is equally applicable here. In this example, an opaque layer 429 may be attached and/or adhered to the second layer 427B to create another unique visual representation.

Figure 7:
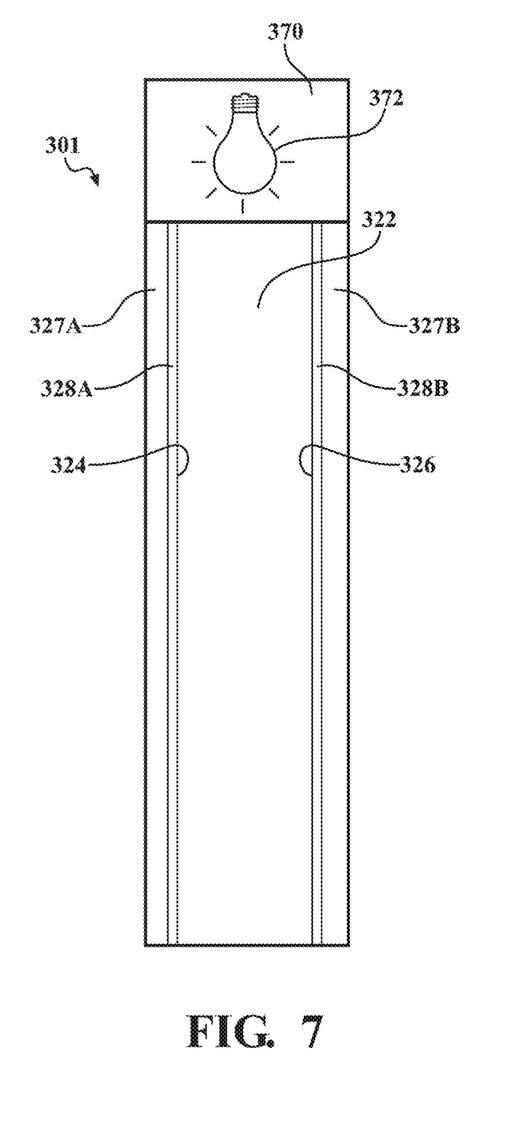
FIGS. 7 and 8 illustrate different examples of the structure that forms a visual representation utilizing a lighting source.
Figure 8:
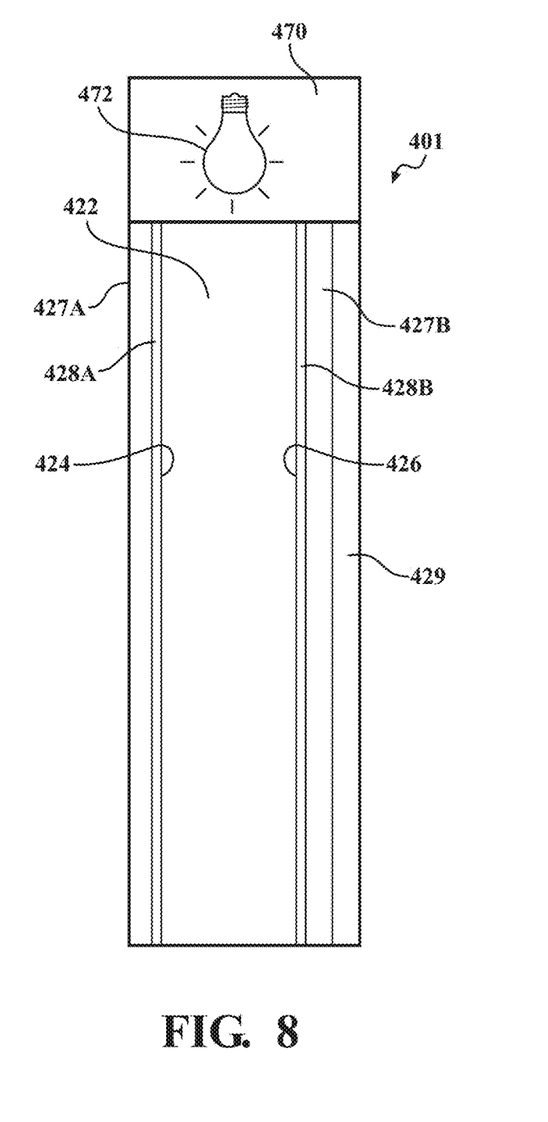

Additionally, it should be understood that different lighting sources could be utilized along with the structures 301 and/or 401. For example, FIG. 7 illustrates the structure 301 of FIG. 5. In this example, the structure 301 includes a lighting source 370 that includes at least one light 372 that radiates light into the interlayer 322. Similarly, FIG. 8 illustrates the structure 401 that includes a lighting source 470 that includes at least one light 472 that emits light into the interlayer 422. In this example, the lighting sources 370 and 470 create a pleasing visual effect as the light emitted into the interlayer 322 and/or 422 interact with one or more cuts that may be formed within the interlayers 322 and/or 422. Using the image processing the angle of the cuts may also be selected for optimal harvesting of the edge lit and precise emission from one or both surfaces of the assembly. The lights 372 and/or 472 can be any type of light capable of radiating radiation. As such, the lights 372 and/or 472 could be incandescent lamps, compact fluorescent lamps, halogen lamps metal halide lamps, light emitting diodes, fluorescent tubes, neon lamps, high intensity discharge lamps, low-pressure sodium lamps, combinations thereof, and the like. Additionally, the lights 372 and/or 472 can radiate light at a variety of different frequencies, not just frequencies that are perceivable to the human eye, for example invisible UV light that may activate a fluorescent interlayer to emit visible light.

Figure 9:
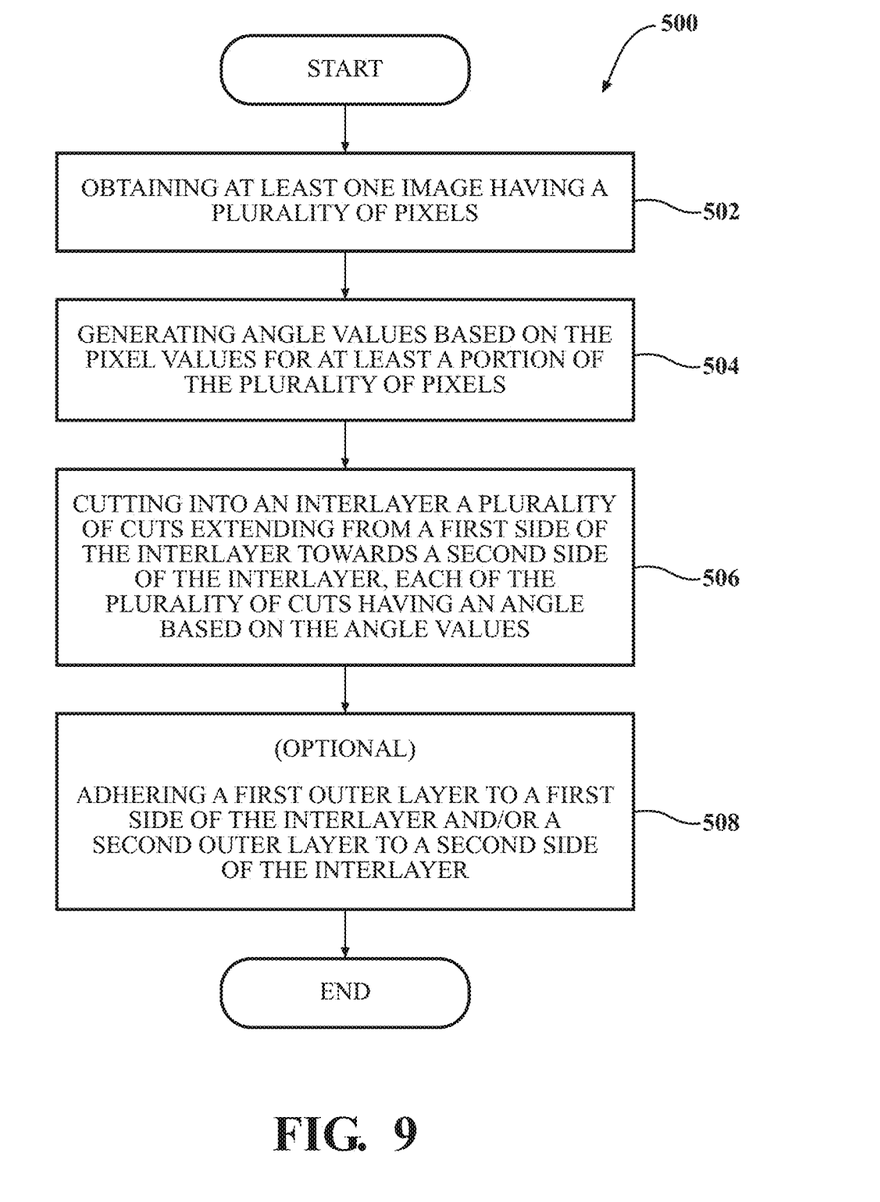
FIG. 9 illustrates a method for making a structure that forms a visual representation.

Referring to FIG. 9, a method 500 for producing a structure that forms a visual representation is shown. The method 500 will be explained from the viewpoint of the process flow 10 of FIG. 1 and the image conversion system 100 of FIG. 2. However, it should be understood that the method 500 may be executed and practiced in any one of a number of different approaches and should not be limited to just those approaches described in this specification. Further, FIGS. 3-6 may also be referenced when describing the method 500 to provide an additional perspective of the structure that forms the visual representation.

In step 502, the method 500 begins by first obtaining at least one image having a plurality of pixels. Here, the image obtaining module 131 may cause the processor(s) 110 to first obtain an image. In one example, referring back to FIG. 1, the image 12 may be a picture. However, the image 12 may take any one of several different forms, as previously mentioned.

In step 504, the image conversion module 132 causes the processor(s) 110 to convert the image 12 into a mapping array 14. As stated previously, the image 12, and images like it, may be made up of a plurality of pixels. Each pixel may have a location value and a pixel value, which may be an intensity value. If the image is a black-and-white or gray-scale image, the intensity value may be a single value indicating how light or dark the pixel is. If the image is a color image, the intensity value of each pixel of the color image may include three values that have different intensities. If the image is a color image, the image conversion module 132 may first convert the color image to a gray-scale image, thus creating only one set of intensity values for each pixel of the color image.

The image conversion module 132 then determines the location and angle for each cut that will be formed into the interlayer, such as the interlayer 18. The angle of each cut is based on the intensity values of one or more pixels from the image. For example, FIG. 3 illustrates a front view of a finished interlayer 222 that has a plurality of cuts 230, 240, 250, and 260. In this example, each of the cuts has a substantially equal width, but the angle of the cut varies. Each cut 230, 240, 250, and/or 260 formed within the interlayer 222 may represent one or more pixels. The angles of each cut 230, 240, 250, and/or 260 varies based on the one or more intensity values of the one or more pixels that the cuts represent.

The determination of the location and angle for each cut may be referred to and saved as the mapping array 122. The mapping array may be scaled up or down, and or a secondary function may be performed on this set, such as to produce perspective, or depth or other visual qualities. The output module 133 causes the processor(s) 110 to output the mapping array 122, which contains information regarding the location angle of the cuts to the cutting device 20. In step 506, the cutting device 20 cuts into an interlayer, such as the interlayer 18, a plurality of cuts extending from one side of the interlayer 18 towards the opposite side of the interlayer 18. The plurality of cuts may extend all the way through the interlayer 18 or may extend only partially into the interlayer 18.

As best shown in FIG. 3, a finished interlayer 222 has been cut using a mapping array 14 that contains the location of the cuts 230, 240, 250, and 260 and their respective angles 232, 242, 252, and 262, the interlayer 222 may form a pleasing visual representation, as best shown by the finished interlayer 22 in FIG. 1.

In step 508, which is indicated as optional, the interlayer 222 may include one or more outer layers, such as the first outer layer 327A and the second outer layer 327B, adhered to opposing sides of the interlayer 222. Also, optional, other additional processes may be performed to the interlayer, such as providing additional lighting, layers, or other components to the interlayer to provide for a more pleasing visual experience.

It should be appreciated that any of the systems described in this specification can be configured in various arrangements with separate integrated circuits and/or chips. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, may include one or more CMOS gates, combinations of gates, or other circuit components. Where multiple modules are described, one or more embodiments may include incorporating the multiple modules into one physical module component. Similarly, where a single module is described, one or more embodiments distribute the single module between multiple physical components.

Additionally, module, as used herein, includes routines, programs, objects, components, data structures, and so on that perform tasks or implement data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), as a graphics processing unit (GPU), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A structure comprising:
a first outer layer and a second outer layer;
an interlayer being disposed between the first outer layer and the second outer layer, the interlayer having a first surface adjacent to the first outer layer and a second surface adjacent to the second outer layer, wherein the first and second surfaces define planes that are parallel to one another;
the interlayer having a plurality of incisions extending from the first surface of the interlayer towards the second surface of the interlayer, each of the plurality of incisions having an angle with respect to the plane defined by the first surface of the interlayer; and
wherein each angle for at least a portion of the plurality of incisions is based on one or more pixel values of at least one image.

2. The structure of claim 1, wherein the interlayer is made of at least one of polymethyl methacrylate, thermoplastic polyurethane, ethylene-vinyl acetate, polyethylene terephthalate glycol, polycarbonate, and glass.

3. The structure of claim 1, further comprising an adhesive layer located between the interlayer and at least one of the first outer layer and the second outer layer.

4. The structure of claim 1, wherein at least one of the first outer layer and the second outer layer is made of at least one of polymethyl methacrylate, polyethylene terephthalate glycol, polycarbonate, and glass.

5. A structure comprising:
a first outer layer and a second outer layer;
an interlayer being disposed between the first outer layer and the second outer layer, the interlayer having a first side adjacent to the first outer layer and a second side adjacent to the second outer layer;
the interlayer having a plurality of cuts extending from the first side of the interlayer towards the second side of the interlayer, each of the plurality of cuts having an angle with respect to a plane formed by a surface of the first side of the interlayer;
wherein each angle for at least a portion of the plurality of cuts is based on one or more pixel values of at least one image; and
wherein the interlayer includes at least one of ultraviolet absorbing materials and fluorescent materials.

6. The structure of claim 1, wherein the first outer layer, the second outer layer, and the interlayer are flat.

7. The structure of claim 1, wherein at least a portion of the plurality of incisions each have a similar width as measured across the first surface of the interlayer.

8. The structure of claim 1, wherein at the plurality on incisions incision intend from the first surface a similar direction.

9. The structure of claim 1, wherein the plurality of incisions extend from the first surface of the interlayer and reach the second surface of the interlayer.

10. The structure of claim 1, wherein at least one of the first outer layer, the second outer layer, and the interlayer are at least partially transparent.

11. The structure of claim 1, wherein at least a portion of the plurality of incisions form a visual representation that resembles the at least one image.

12. The structure of claim 1, wherein the at least one image is at least one of a graphic, letter, number, landscape image, geometric shape, abstract pattern, face of a human or animal, or natural scene.

13. The structure of claim 1, further comprising a light source positioned to direct at least a portion of light radiating from the light source into at least a portion of the interlayer.

* * * * *